US010766597B2

(12) United States Patent
Movsesian et al.

(10) Patent No.: US 10,766,597 B2
(45) Date of Patent: *Sep. 8, 2020

(54) AIRCRAFT PRIVACY DOOR AND DOOR FRAME ASSEMBLY

(71) Applicant: The Boeing Company, Chicago, IL (US)

(72) Inventors: Sami Movsesian, Glendale, CA (US); Steven H. Sauer, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 319 days.

This patent is subject to a terminal disclaimer.

(21) Appl. No.: 15/935,318

(22) Filed: Mar. 26, 2018

(65) Prior Publication Data
US 2019/0241247 A1  Aug. 8, 2019

Related U.S. Application Data

(60) Provisional application No. 62/628,254, filed on Feb. 8, 2018.

(51) Int. Cl.
B64C 1/14 (2006.01)
B64D 45/00 (2006.01)
B64C 1/00 (2006.01)

(52) U.S. Cl.
CPC .......... B64C 1/1469 (2013.01); B64C 1/1461 (2013.01); B64D 45/0026 (2019.08); B64D 45/0028 (2019.08); B64C 2001/009 (2013.01)

(58) Field of Classification Search
CPC . B64D 45/0015; B64C 1/1469; E05B 15/022; E05B 63/244; E05B 63/246; E05B 63/248
See application file for complete search history.

(56) References Cited

U.S. PATENT DOCUMENTS 5,426,819 A   6/1995  Rohn
6,484,449 B1  11/2002 Artsiely
(Continued)

FOREIGN PATENT DOCUMENTS

GB   2419158   4/2006
JP   2909463    6/1999
(Continued)

OTHER PUBLICATIONS

European Search Report prepared by the European Patent Office in Application No. EP 19 15 2817 dated May 31, 2019.
(Continued)

Primary Examiner — Joseph W Sanderson
(74) Attorney, Agent, or Firm — McDonnell Boehnen Hulbert & Berghoff LLP

(57) ABSTRACT

A privacy door assembly for installation in an aircraft relative to a flight deck door of the aircraft includes a door frame having a first post and a second post, where the second post comprises a latch recess. The privacy door assembly also includes a privacy door rotatably coupleable to the first post via a set of hinges, where the privacy door comprises a decompression latch arranged to engage the latch recess when the privacy door is in a closed position within the door frame, and where the decompression latch is configured to disengage from the latch recess in response to a decompression detected on a forward side of the privacy door.

30 Claims, 12 Drawing Sheets

(56) References Cited

U.S. PATENT DOCUMENTS

| | | | | |
|---|---|---|---|---|
| 6,702,231 B2* | 3/2004 | Ward | B64C 1/1469 | 244/118.5 |
| 6,866,226 B2* | 3/2005 | Pratt | B64C 1/1469 | 244/129.4 |
| 6,871,821 B2* | 3/2005 | Takahama | B64C 1/1469 | 244/118.5 |
| 7,032,863 B1* | 4/2006 | Piorkowski | B64C 1/1469 | 244/129.4 |
| 7,172,154 B2* | 2/2007 | Tomiyama | B64C 1/1469 | 244/118.5 |
| 7,568,659 B2* | 8/2009 | Roques | B64C 1/1407 | 244/121 |
| 7,578,475 B2* | 8/2009 | Pratt | B64C 1/1469 | 244/129.4 |
| 7,896,290 B2* | 3/2011 | Saku | B64C 1/1469 | 244/129.5 |
| 7,984,875 B2* | 7/2011 | Koehn | B64C 1/1469 | 244/118.5 |
| 9,045,214 B2* | 6/2015 | Koch | B64C 1/1469 | |
| 2002/0092951 A1 | 7/2002 | Haviv | | |
| 2003/0066930 A1* | 4/2003 | Pratt | B64C 1/1469 | 244/118.5 |
| 2003/0066931 A1* | 4/2003 | Ward | B64C 1/1469 | 244/118.5 |
| 2003/0122387 A1 | 7/2003 | Ward | | |
| 2003/0132345 A1* | 7/2003 | Lehmann | B64C 1/1469 | 244/118.5 |
| 2004/0061027 A1* | 4/2004 | Movsesian | B64C 1/1469 | 244/129.1 |
| 2004/0144895 A1* | 7/2004 | Takahama | B64C 1/1469 | 244/129.5 |
| 2004/0239126 A1* | 12/2004 | Pratt | B64C 1/1469 | 292/227 |
| 2005/0116100 A1* | 6/2005 | Pratt | B64C 1/1469 | 244/118.5 |
| 2005/0224649 A1* | 10/2005 | Tomiyama | B64C 1/1469 | 244/118.5 |
| 2006/0048449 A1* | 3/2006 | Roques | B64C 1/1407 | 49/62 |
| 2006/0102788 A1* | 5/2006 | Piorkowski | B64C 1/1469 | 244/129.4 |
| 2007/0164572 A9* | 7/2007 | Pratt | B64C 1/1469 | 292/227 |
| 2008/0111025 A1* | 5/2008 | Saku | B64C 1/1469 | 244/129.5 |
| 2009/0065641 A1* | 3/2009 | Koehn | B64C 1/1469 | 244/118.5 |
| 2013/0269258 A1* | 10/2013 | Koch | B64C 1/1469 | 49/67 |
| 2018/0334237 A1* | 11/2018 | King | B64D 11/02 | |
| 2018/0346091 A1 | 12/2018 | Movsesian et al. | | |
| 2019/0241246 A1* | 8/2019 | Movsesian | B64C 1/1461 | |

FOREIGN PATENT DOCUMENTS

| | | |
|---|---|---|
| WO | WO 03/029585 | 4/2003 |
| WO | WO 03/029591 | 4/2003 |
| WO | WO 03/106796 | 12/2003 |

OTHER PUBLICATIONS

European Search Report prepared by the European Patent Office in Application No. EP 19 15 2816 dated May 28, 2019.

U.S. Appl. No. 15/611,155, filed Jun. 1, 2017. Flight Deck Barrier Door, Aircraft Comprising Flight Deck Barrier Door, and Method of Using Flight Deck Barrier Door.

U.S. Appl. No. 15/599,321, filed May 18, 2017. Aircraft Monument Having a Secondary Security Door.

Search Report and Written Opinion prepared by the European Patent Office in application No. NL 2020766 dated Jul. 6, 2018.

European Search Report prepared by the European Patent Office in Application No. EP 19 15 2820.7 dated Jun. 13, 2019.

\* cited by examiner

AIRCRAFT PRIVACY DOOR AND DOOR FRAME ASSEMBLY

CROSS-REFERENCE TO RELATED APPLICATIONS

The present application claims priority from U.S. Provisional Application No. 62/628,254, filed Feb. 8, 2018, the contents of which are incorporated by reference herein in their entirety.

FIELD

The present disclosure generally relates to an aircraft privacy door and related door frame assembly.

BACKGROUND

During both ground operations and flight operations of an aircraft, it may be necessary to open the flight deck door that separates the flight deck, or cockpit, from the cabin of the aircraft. For instance, when a flight crew is replaced during ground operations, one flight crew will leave the flight deck and another flight crew will enter the flight deck. In the case of a passenger aircraft, this often occurs while passengers are deplaning and boarding, which frequently takes place near the front of the aircraft, adjacent to the flight deck. In such situations, it would be desirable to provide separation between the flight deck and the cabin of the aircraft. In some cases, a simple curtain is drawn to separate the flight deck from the cabin area, while the flight crew moves in and out of the aircraft.

Similarly, during flight operations, a member of the flight crew may need to leave the flight deck temporarily, requiring the flight deck door to be opened. Again, in these situations, it would be desirable to separate the cabin area from the flight deck when the flight deck door must be opened during flight operations to provide the privacy, security, or both, that may be needed.

What is needed is an improved way to provide separation between different areas of an aircraft during both flight and ground operations.

SUMMARY

In one example, a method for establishing a privacy door relative to a flight deck door of an aircraft is described, where the flight deck door, when in a closed position, separates a flight deck area of the aircraft from a cabin area of the aircraft. The method includes positioning a door frame in the cabin area, aft of the flight deck door, where the door frame comprises a first post and a second post, and where the second post comprises a latch recess. The method also includes coupling the door frame to the aircraft. The method also includes coupling the privacy door to the first post via a set of hinges such that the privacy door, when in a closed position, separates the cabin area into an intermediate cabin area between the privacy door and the flight deck door and a main cabin area aft of the privacy door, where the privacy door is rotatable via the set of hinges into the intermediate cabin area to an open position, where the privacy door comprises a decompression latch arranged to engage the latch recess when the privacy door is in the closed position, and where the decompression latch is configured to disengage from the latch recess in response to a decompression of the aircraft detected forward of the privacy door.

In another example, a privacy door system is described including a flight deck door, where the flight deck door, when in the closed position, separates the flight deck area of the aircraft from the cabin area of the aircraft. The privacy door system also includes a privacy door disposed within the cabin area of the aircraft and aft of the flight deck door such that the privacy door, when in the closed position, separates the cabin area into the intermediate cabin area between the privacy door and the flight deck door and the main cabin area aft of the privacy door, where the privacy door further comprises the decompression latch. The privacy door system also includes a door frame comprising the first post and the second post, where the privacy door is rotatably coupled to the first post via the set of hinges such that the privacy door is rotatable into the intermediate cabin area to the open position. The privacy door system also includes a latch recess positioned within the second post, where the latch recess is arranged to engage the decompression latch of the privacy door when the privacy door is in the closed position, and where the decompression latch is configured to disengage from the latch recess in response to the decompression of the aircraft detected forward of the privacy door.

In another example, a privacy door assembly for installation in an aircraft relative to a flight deck door of the aircraft is described. The privacy door assembly includes a door frame having a first post and a second post, where the second post comprises a latch recess. The privacy door assembly also includes a privacy door rotatably coupleable to the first post via a set of hinges, where the privacy door comprises a decompression latch arranged to engage the latch recess when the privacy door is in a closed position within the door frame, and where the decompression latch is configured to disengage from the latch recess in response to a decompression detected on a forward side of the privacy door.

In another example, an aircraft is described including a flight deck door, where the flight deck door, when in a closed position, separates a flight deck area of the aircraft from a cabin area of the aircraft. The aircraft also includes a privacy door disposed within the cabin area of the aircraft and aft of the flight deck door such that the privacy door, when in a closed position, separates the cabin area into an intermediate cabin area between the privacy door and the flight deck door and a main cabin area aft of the privacy door, where the privacy door further comprises a decompression latch. The aircraft also includes a door frame comprising a first post and a second post, where the privacy door is rotatably coupled to the first post via a set of hinges such that the privacy door is rotatable into the intermediate cabin area to an open position. The aircraft also includes a latch recess positioned within the second post, where the latch recess is arranged to engage the decompression latch of the privacy door when the privacy door is in the closed position, and where the decompression latch is configured to disengage from the latch recess in response to a decompression of the aircraft detected forward of the privacy door.

In another example, a method for operation of a privacy door on an aircraft is described, wherein the aircraft comprises a flight deck door that, when in a closed position, separates a flight deck area of the aircraft from a cabin area of the aircraft. The method includes, before opening the flight deck door from the closed position, closing the privacy door such that the privacy door is closed when the flight deck door is open, where the privacy door is disposed within the cabin area of the aircraft and aft of the flight deck door such that the privacy door, when in a closed position, separates the cabin area into an intermediate cabin area between the privacy door and the flight deck door and a main cabin area aft of the privacy door, where the privacy door is rotatably coupled to a first post of a door frame via a set of hinges, and where closing the privacy door comprises engaging a decompression latch of the privacy door with a latch recess positioned within a second post of the door frame. The method also includes opening the flight deck door. The method also includes, before opening the privacy door, closing the flight deck door such that the flight deck door is closed when the privacy door is open. The method also includes manually opening the privacy door from the closed position to an open position, where manually opening the privacy door comprises disengaging the decompression latch from the latch recess.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include systems and methods for establishing and operating a privacy door in an aircraft, relative to a flight deck door of the aircraft. The privacy door may be situated aft of the flight deck door, and may be closed whenever the flight deck door needs to be opened.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
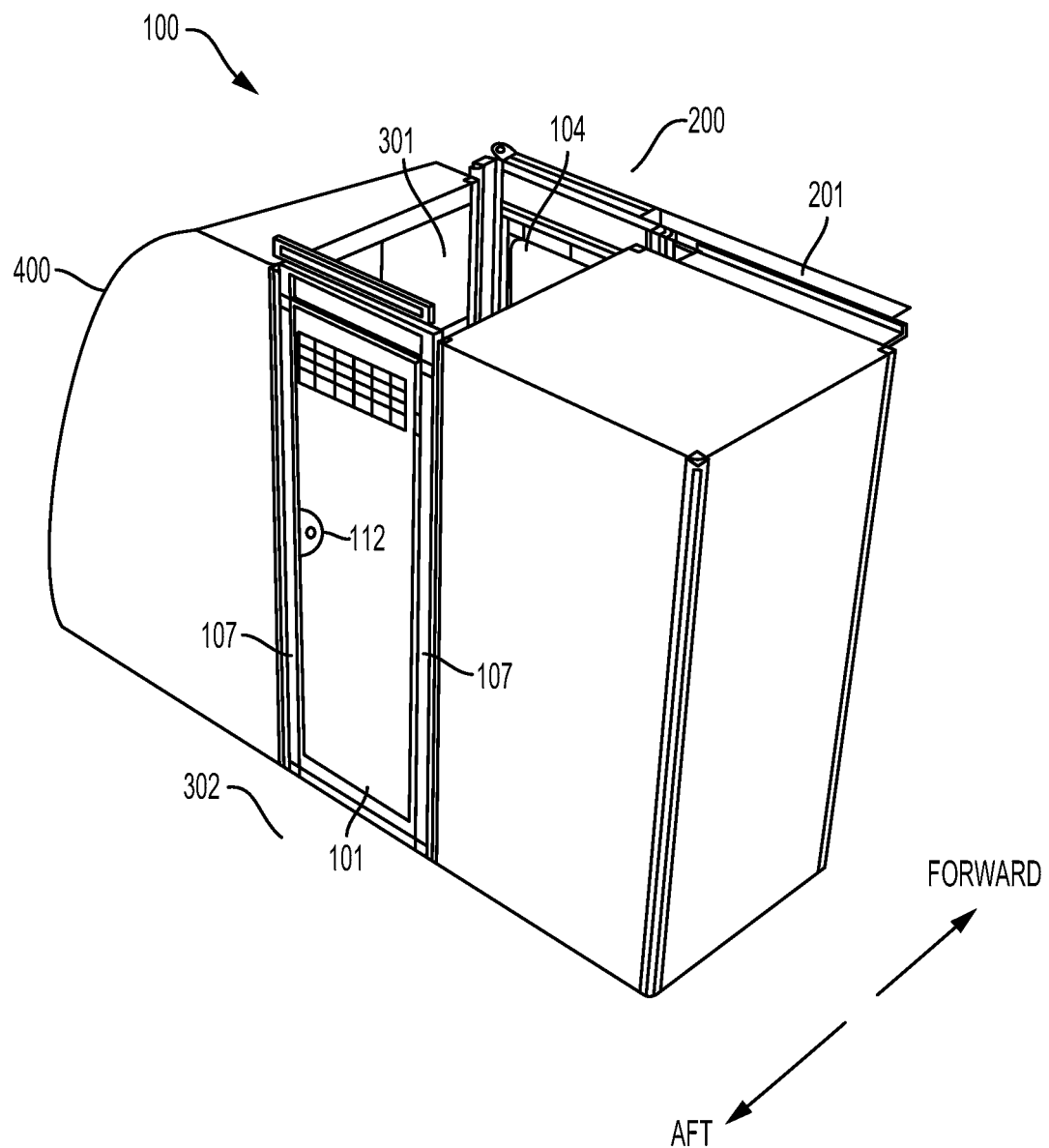
FIG. 1 illustrates a perspective view of a privacy door relative to a flight deck door of an aircraft, according to an example implementation.
Figure 2:
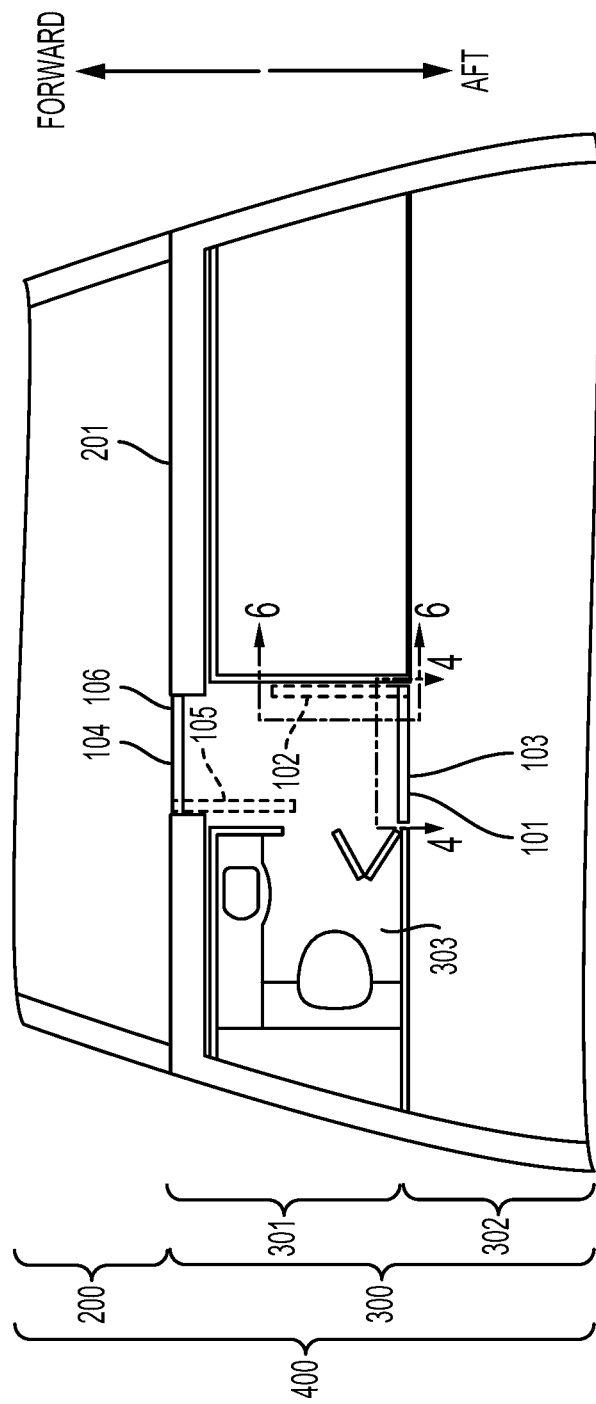
FIG. 2 illustrates a plan view of a privacy door relative to a flight deck door of an aircraft, according to an example implementation.

Referring now to FIGS. 1 and 2, a portion of an aircraft 400 is shown, immediately aft of the flight deck area 200, or cockpit. The aircraft 400 may be, for example, a passenger aircraft, and may include a flight deck door 104. As shown in FIGS. 1 and 2, the flight deck door 104, when in a closed position 106, separates the flight deck area 200 of the aircraft 400 from the cabin area 300 of the aircraft 400. Similarly, the forward bulkhead 201, shown in FIGS. 1 and 2 and discussed further below, separates the flight deck area 200 from the cabin area 300 of the aircraft 400.

As noted above, it may be desirable in some situations to maintain privacy and/or security of the flight deck area 200 and/or flight crew on the aircraft 400, including during instances where the flight deck door 104 may need to be moved to an open position 105. Accordingly, the aircraft 400 includes a privacy door 101 disposed within the cabin area 300 of the aircraft 400 and aft of the flight deck door 104. The privacy door 101, when in a closed position 103, separates the cabin area 300 into an intermediate cabin area 301 between the privacy door 101 and the flight deck door 104, and a main cabin area 302 aft of the privacy door 101. In this configuration, the privacy door 101 may be closed when the flight deck door 104 needs to be opened. The flight deck door 104 and the privacy door 101 may together be considered part of a privacy door system 100, as indicated in the perspective view of FIG. 1.

FIG. 2 shows a plan view indicating both the closed positions and the open positions, in dashed lines, of the flight deck door 104 and the privacy door 101. FIG. 2 shows the intermediate cabin area 301, which may include, for example, a lavatory 303. FIG. 2 also indicates two cross-sectional views of the privacy door 101. The first cross-sectional view, labeled 4-4, is facing aft when the privacy door 101 is in the closed position 103, and is detailed in FIG. 4. The second cross-sectional view of the privacy door is labeled 6-6, and faces in the outboard direction toward the right side of the aircraft 400, when the privacy door 101 is in the open position 102, and is detailed in FIG. 6.

Figure 3:
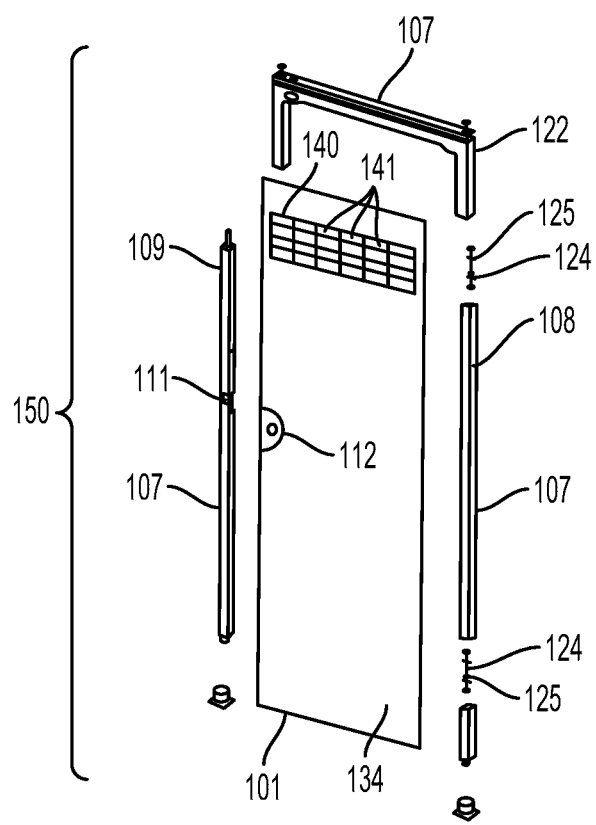
FIG. 3 illustrates an exploded view of a privacy door assembly, according to an example implementation.

The privacy door system 100 of the aircraft 400 further includes a door frame 107 which, in conjunction with the privacy door 101, may be considered a privacy door assembly 150, as shown in the exploded view of FIG. 3. As shown in FIG. 3, the door frame 107 may include a first post 108 and a second post 109. The privacy door 101 may be rotatably coupled to the first post 108 via a set of hinges 124, such that the privacy door 101 is rotatable into the intermediate cabin area 301 to an open position 102, as can be seen in FIG. 2.

As shown in FIG. 3, a latch recess 111 may be positioned within the second post 109 of the door frame 107. The latch recess 111 is arranged to engage a decompression latch 112 of the privacy door 101 when the privacy door 101 is in the closed position 103. Further, the decompression latch 112 may be configured to disengage from the latch recess 111 in response to a decompression of the aircraft 400 detected forward of the privacy door 101.

In some implementations, the privacy door 101 may generally remain open during operation of the aircraft, as the cabin crew (e.g., flight attendants) move between the intermediate cabin area 301 and main cabin area 302, and while the flight deck door 104 generally remains closed. Accordingly, in some embodiments the set of hinges 124 may include a hinge spring 125 positioned to bias the privacy door 101 from the closed position 103 to the open position 102 when the decompression latch 112 and the latch recess 111 are disengaged. As shown in FIG. 3, the set of hinges 124 may include a hinge spring 125 in each of the multiple individual hinges, or there may alternatively be a single hinge spring 125. Further, the privacy door 101 or the door frame 107 may include other springs or similar components to bias the privacy door 101 to the open position 102 when the decompression latch 112 and the latch recess 111 are disengaged.

As noted above, the decompression latch 112 may disengage from the latch recess 111 in response to a decompression of the aircraft 400 detected forward of the privacy door 101. For example, a decompression of the aircraft 400 may be detected in the flight deck area 200, which may cause higher pressure air from the main cabin area 302 to be drawn forward, toward the flight deck area 200. Because the volume of air in the main cabin area 302 may be much larger than the volume of air in the flight deck area 200, the rate of airflow in the forward direction may be quite high. In this situation, the decompression latch 112 may disengage from the latch recess 111, as further discussed below, allowing the privacy door 101 to open. The flight deck door 104 may be configured similarly. This may allow both doors to fully open during a decompression in the flight deck area 200, which may help to reduce the forces acting on the forward bulkhead 201 as a result of the decompression.

Alternatively, a decompression of the aircraft 400 may be detected aft of the privacy door 101. In this situation, it may not be necessary for the privacy door 101 or the flight deck door 104 to fully open, because a relatively smaller volume of higher pressure air from the flight deck area 200 would be moving into the relatively larger volume of the main cabin area 302. Accordingly, as shown in FIG. 3, the privacy door 101 may include a vent 140, as shown in FIG. 3. The vent 140 may include a plurality of openings 141 forming a fluid connection between the intermediate cabin area 301 and the main cabin area 302 when the privacy door 101 is in the closed position 103. Further, the plurality of openings 141 may include an open area that is sufficient to convey an airflow rate from the intermediate cabin area 301 to the main cabin area 302 in response to a decompression of the aircraft 400 detected aft of the privacy door. For example, the open area may be large enough to convey the higher pressure air to the area of lower pressure without imposing excessive structural loads on the privacy door 101, the door frame 107, and the adjacent structure of the aircraft 400. In this way, the privacy door 101 may not need to open in response to a decompression in the main cabin area 302.

Figure 4:
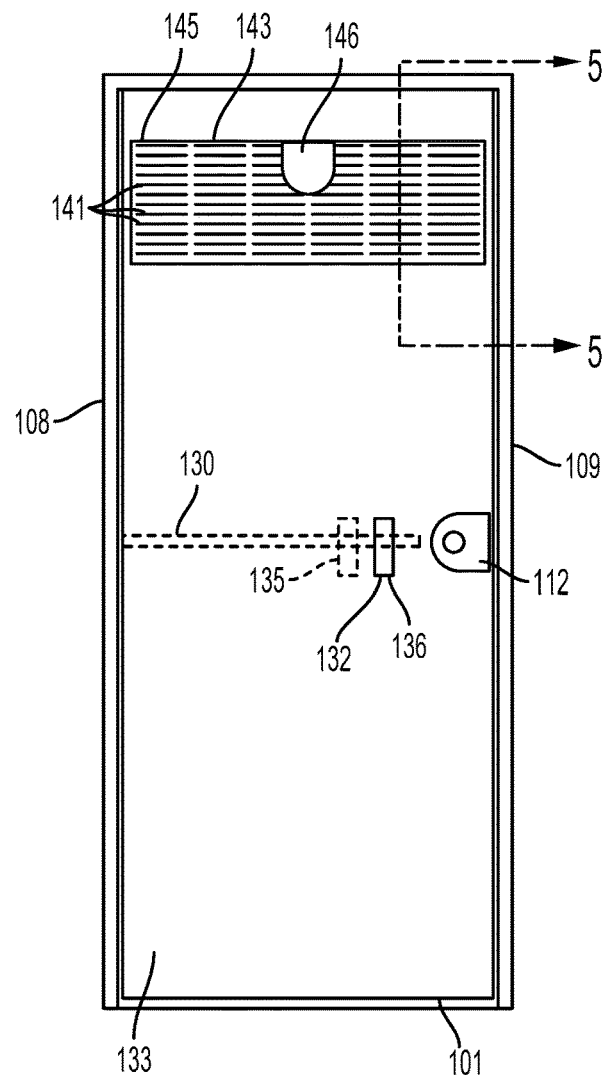
FIG. 4 illustrates an aft-facing view of a privacy door in a closed position, as indicated in FIG. 2, according to an example implementation.
Figure 5:
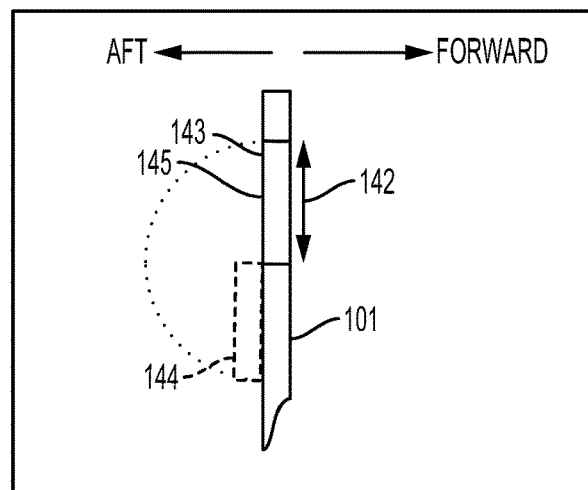
FIG. 5 illustrates a cross-sectional view of a panel in both closed and open positions, as indicated in FIG. 4, according to an example implementation.

Other arrangements are also possible. For example, the privacy door 101 may include an aperture 142 that is covered by a panel 143, as shown in FIGS. 4 and 5. FIG. 4 shows an aft-facing view of the privacy door 101 in the closed position 103, and thus shows the forward side 133 of the privacy door 101. FIG. 5 shows the cross-sectional view of the aperture 142 and panel 143 indicated in FIG. 4. The aperture 142 may have an open area sufficient to convey an airflow rate from the intermediate cabin area 301 to the main cabin area 302 in response to a decompression of the main cabin area 302 when the privacy door is in the closed position 103, as discussed above. The panel 143 may be rotatably coupled to the privacy door 101 and may further include a panel decompression latch 146 configured to engage the privacy door 101 and maintain the panel 143 in the closed position 145 such that the panel 143 covers the aperture 142. In response to a decompression of the aircraft 400 detected aft of the privacy door 101, the panel decompression latch 146 is further configured to disengage from the privacy door 101, and the panel 143 may be rotatable into the main cabin area 302 from the closed position 145 to an open position 144.

For instance, FIGS. 4 and 5 illustrate a panel 143 that is rotatably coupled to the privacy door 101 along the panel's bottom edge, and includes a panel decompression latch 146 along its top edge. Accordingly, when the panel decompression latch 146 disengages from the privacy door 101, the panel 143 rotates aft and downward, into the main cabin area 302, as seen in FIG. 5. In some embodiments, the panel 143 may include a plurality of openings 141 to facilitate normal air flow between the intermediate cabin area 301 and the main cabin area 302 when the privacy door is closed. However, the plurality of openings 141 may not have an open area sufficient to convey the airflow rate resulting from a decompression event, and thus the panel 143 will rotate to the open position 144. In other implementations, the panel 143 may be solid, without any openings. Other arrangements are also possible.

FIG. 4 also illustrates a slam latch 130 that may be included in the privacy door 101, including a lever 132 that includes a second position 136, as well as a first position 135 shown in a dashed line. The slam latch 130 and lever 132 will now be discussed in more detail with respect to FIG. 6.

As noted above, the view shown in of FIG. 6 faces in the outboard direction toward the right side of the aircraft 400, when the privacy door 101 is in the open position 102. For clarity, some elements such as the set of hinges 124 and the second post 109 are not shown in FIG. 6. As previously mentioned, the privacy door 101 may generally remain in the open position 102 during operation of the aircraft 400. Accordingly, the privacy door 101 may include a slam latch 130 positioned to engage a slot 131 in the first post 108 of the door frame 107 when the privacy door 101 is in the open position 102, and when the slam latch 130 is in a first position 135. The slam latch 130 may be located internally within the privacy door 101, and thus it is shown in a dashed line in FIG. 6.

The privacy door 101 may further include a slam latch spring 137 positioned to bias the slam latch 130 toward the first post 108. Similar to the slam latch 130, the slam latch spring 137 may be contained within the privacy door 101. Other arrangements are also possible.

Figure 6:
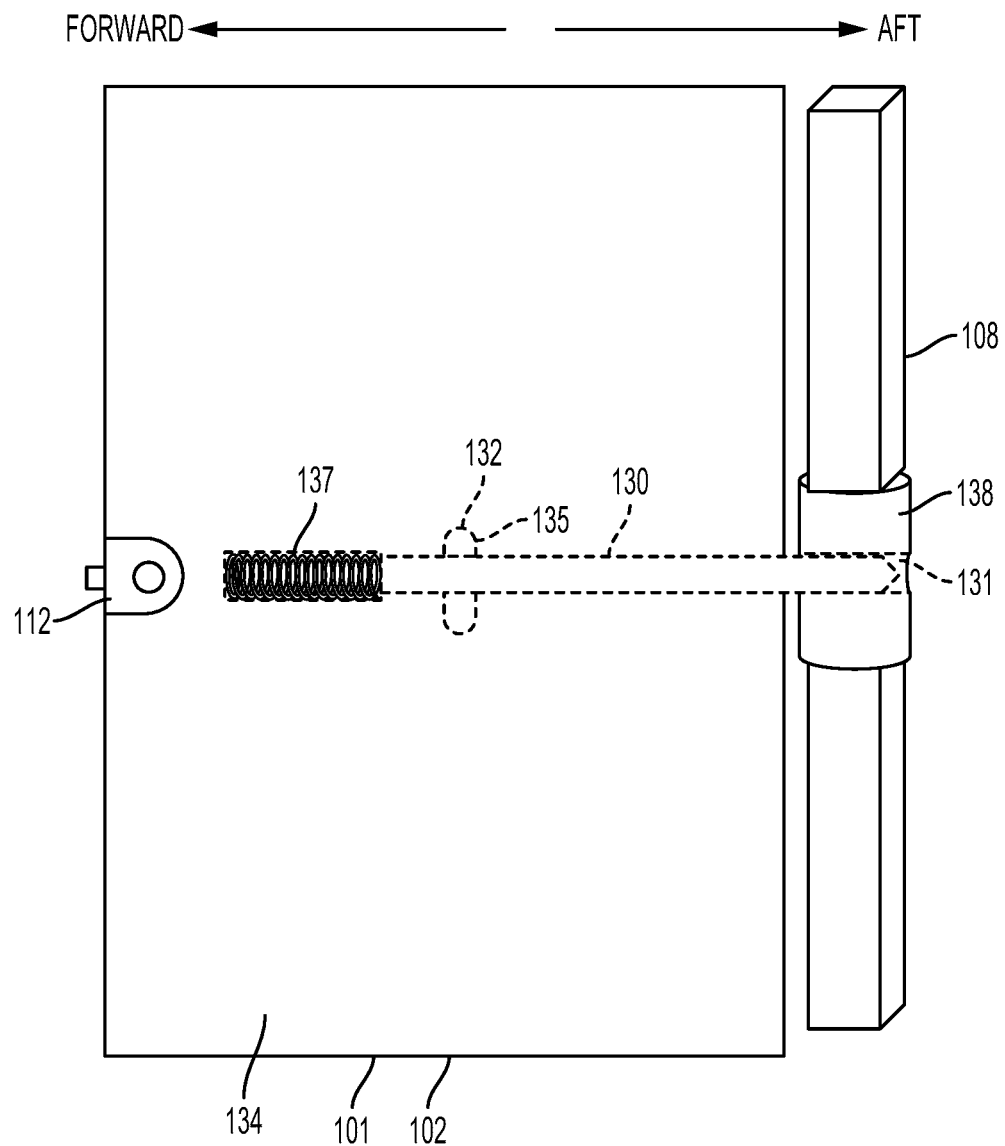
FIG. 6 illustrates an outboard-facing view of a privacy door in an open position, as indicated in FIG. 2, according to an example implementation.

Further, the slam latch 130 may be coupled to a lever 132 positioned on the forward side 133 of the privacy door 101. Because the view shown in FIG. 6 shows the privacy door 101 in the open position 102, it illustrates the aft side 134 of the privacy door 101. The lever 132 is therefore shown as a dashed line in FIG. 6, as it is on the opposite side of the privacy door 101.

Figure 7:
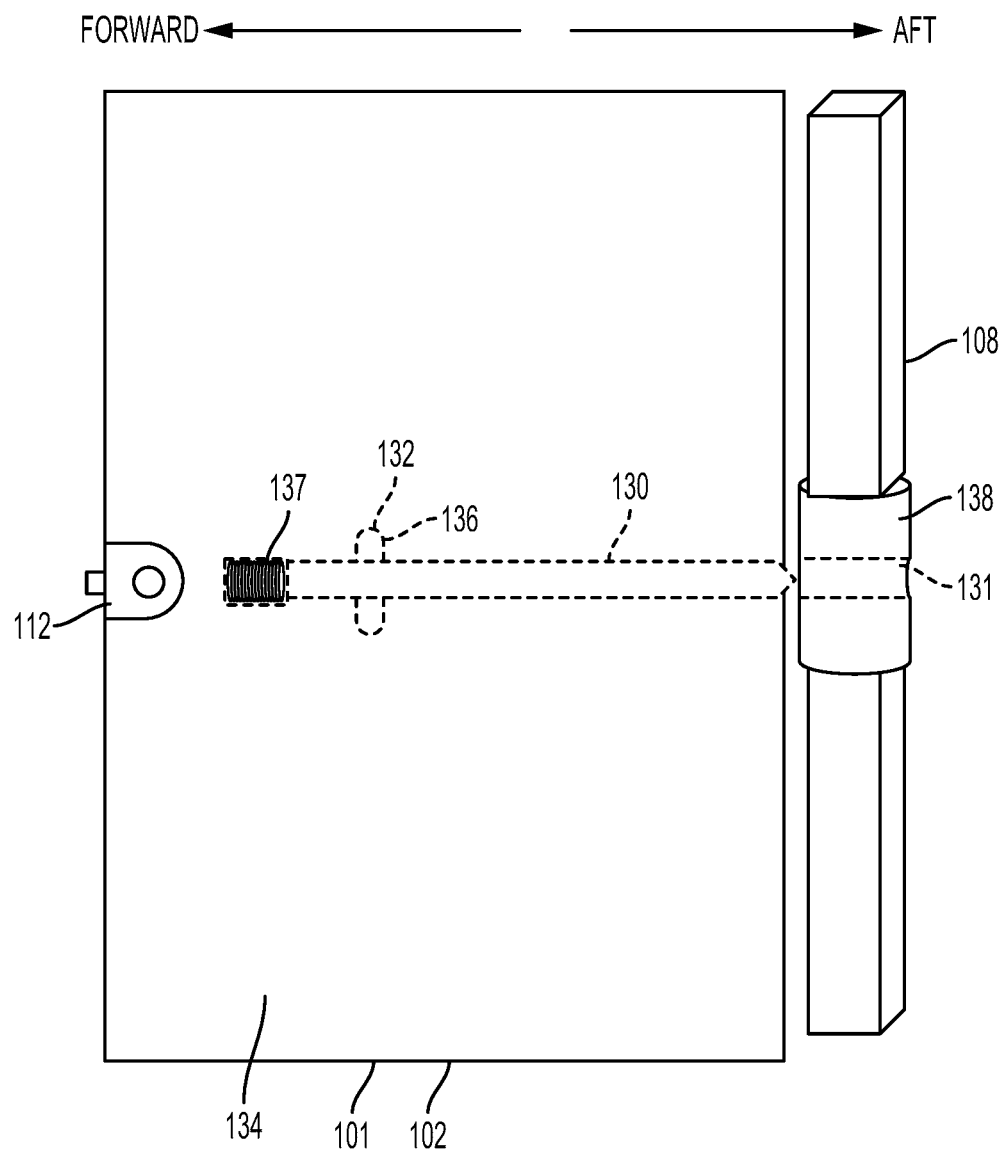
FIG. 7 illustrates another outboard-facing view of the privacy door shown in FIG. 6, according to an example implementation.

The lever 132 may be operable to move the slam latch 130 away from the first post 108 to a second position 136 so as to disengage the slam latch 130 from the slot 131. This is shown in FIG. 7, which shows the same view of the privacy door 101 as that shown in FIG. 6. As can be seen in FIG. 7, the slam latch spring 137 is compressed as the lever 132 is moved from the first position 135 to the second position 136. Once the slam latch 130 is disengaged from the slot 131, the privacy door 101 may be rotated from the open position 102 to the closed position 103, for example.

After disengaging the slam latch 130 from the slot 131, the lever 132 may be released, and the slam latch spring 137 may bias the slam latch back toward the first post 108. This may cause the slam latch 130 to abut the first post 108 while the privacy door is rotating from the open position 102 to the closed position 103. Therefore, in some embodiments, the first post 108 may include a cylindrical striker 138, and the cylindrical striker 138 may include the slot 131, as shown in FIGS. 6 and 7. The cylindrical striker 138 may generally protect the first post 108 from strikes from the slam latch 130 during opening and closing of the privacy door 101. Further, in an embodiment where the first post 108 is square or rectangular in cross section, the cylindrical striker 138 may allow the privacy door 101 to rotate more smoothly, without the tip of the slam latch 130 binding on the corners of the first post 108.

Figure 8:
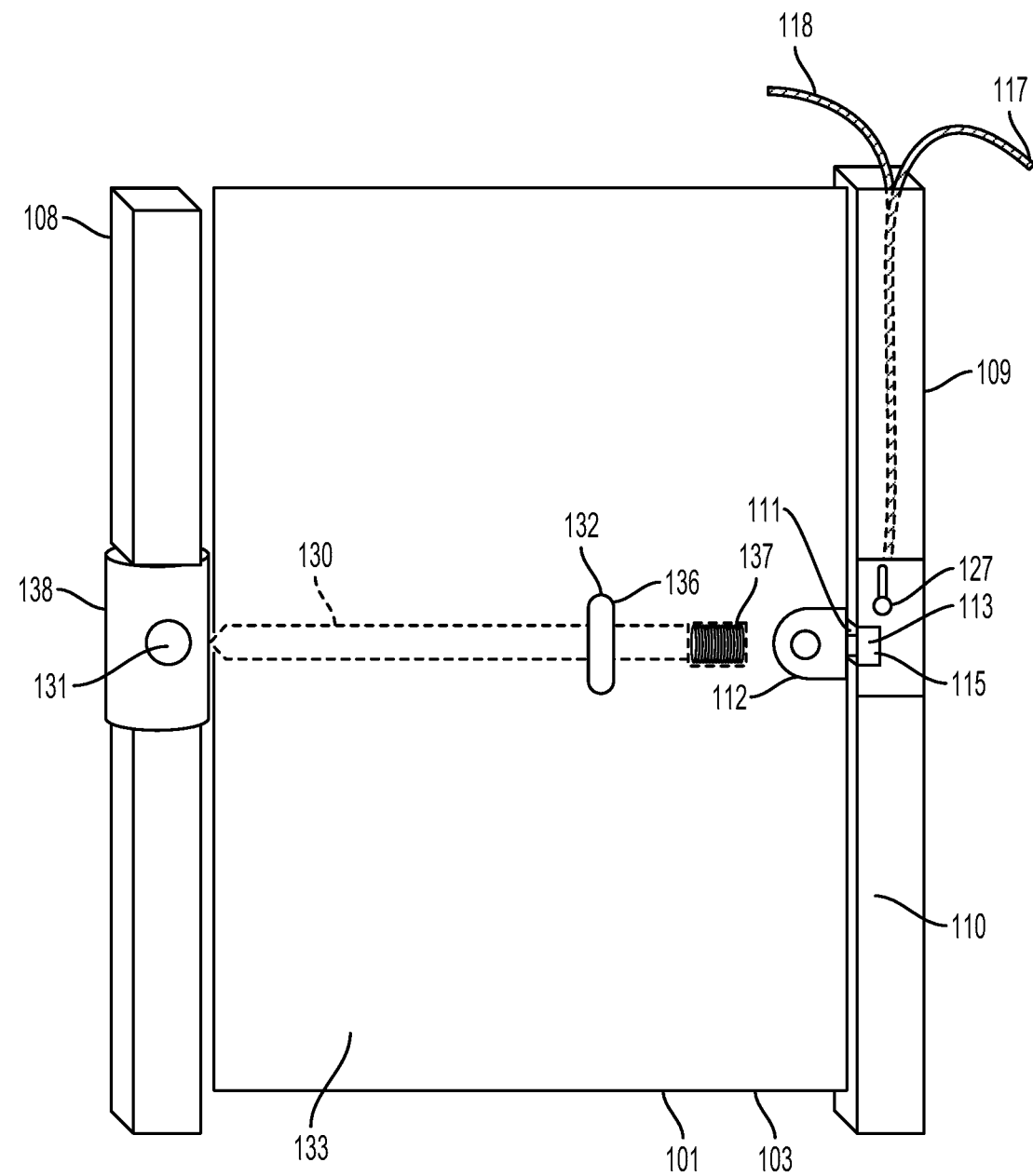
FIG. 8 illustrates an aft-facing view of a privacy door in a closed position, according to an example implementation.
Figure 9:
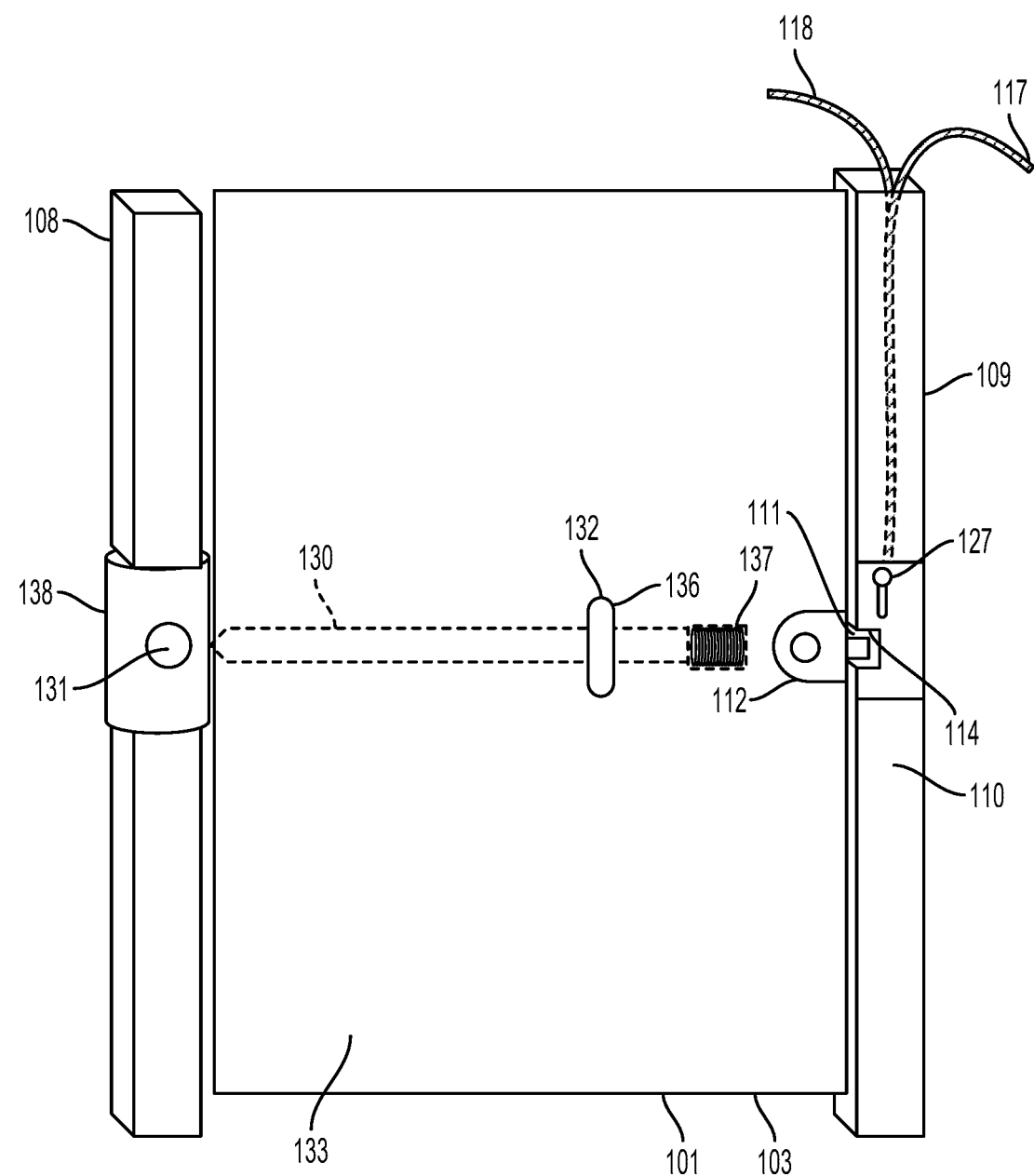
FIG. 9 illustrates another aft-facing view of a privacy door in a closed position, according to an example implementation.

Turning now to FIGS. 8 and 9, and aft-facing view of the privacy door 101 in the closed position 103 is shown. Accordingly, the forward side 133 is the privacy door 101 is depicted, and the lever 132 can be seen. Further, the lever 132 is in the second position 136, as the slam latch 130 is disengaged from the slot 131. The slam latch spring 137 is compressed, and biases the slam latch 130 toward the first post 108, where the slam latch 130 abuts the cylindrical striker 138.

In some embodiments, the second post 109 includes a gate 113 movable between an open position 114, and a closed position 115. The closed position 115 of the gate 113 is shown in FIG. 8, and the open position 114 can be seen in FIG. 9. The gate 113 may be configured to retain the decompression latch 112 within the latch recess 111. Further, the gate 113 may be coupled to a knob 127 positioned on a forward side 110 of the second post 109, and the knob 127 may be operable to move the gate 113 to the open position 114 such that the gate 113 does not retain the decompression latch 112 in the latch recess 111. As shown in FIG. 9, the gate 113 and the knob 127 have moved upward, so that the decompression latch is free to move out of the latch recess 111.

In this arrangement, with the knob 127 positioned on the forward side 110 of the second post 109, it may be possible to open the privacy door 101 from the intermediate cabin area 301. Conversely, the aft side of the second post 109 might not include any components for operating the knob 127, or the gate 113. Thus, the privacy door 101 might not be openable via a handle or knob from the main cabin area 302 when the gate 113 is in the closed position 115, which may enhance the privacy and/or security of the privacy door 101.

Nonetheless, it may be desirable to provide for the ability to open the privacy door 101 from the main cabin area 302, should the need arise. The ability to do so may be discreet, although it may be known to the cabin crew, flight crew, or others. For example, the gate 113 may be coupled to a main cabin cable 118 extending from the second post 109 to the main cabin area 302 of the aircraft 400. The main cabin cable 118 may be operable from the main cabin area 302 to move the gate 113 from the closed position 115 to the open position 114 such that the gate 113 does not retain the decompression latch 112 in the latch recess 111. For instance, the operable portion of the main cabin cable 118 may extend into the main cabin area 302 and be located somewhere that is not readily visible, such as behind a panel, or in a closet, among other possibilities.

Once the gate 113 is moved to the open position 114, the privacy door 101 can be pushed open from the main cabin area 302. In some embodiments, the hinge spring 125 may bias the privacy door 101 to the open position 102 once the gate 113 is moved to the open position 114, and decompression latch 112 is no longer engaged in the latch recess 111.

In some embodiments, it may be desirable to allow for the privacy door 101 to be opened from the flight deck area 200. In one example, the privacy door 101 may be closed during flight of the aircraft 400. For instance, the cabin crew may disengage the slam latch 130 and close the privacy door 101 behind them as they enter the main cabin area 302 and proceed with in-flight operations. This may allow the flight deck door 104 to be opened so that the pilot can enter the intermediate cabin area 301 and use the lavatory 303, for example. Once the pilot returns to the flight deck area 200 and closes the flight deck door 104, there may be no crew members in the intermediate cabin area 301 to reopen the privacy door 101 via the knob 127. Therefore, the gate 113 may be coupled to a flight deck cable 117 extending from the second post 109 to the flight deck area 200 of the aircraft 400. The flight deck cable 117 may be operable from the flight deck area 200 to move the gate 113 from the closed position 115 to the open position 114 such that the gate 113 does not retain the decompression latch 112 in the latch recess 111.

The privacy door system 100 discussed here may include one or both of the main cabin cable 118 and the flight deck cable 117. Similar to the operation of the main cabin cable 118 discussed above, moving the gate 113 to the open position 114 via the flight deck cable 117 may allow the privacy door 101 to be pushed open from the main cabin area 302. Additionally or alternatively, the hinge spring 125 may bias the privacy door 101 to the open position 102 once the gate 113 is moved to the open position 114, and decompression latch 112 is no longer engaged in the latch recess 111.

In some embodiments, the privacy door 101 may be rotated to the closed position 103, but the gate 113 may be left in the open position 114. This may allow the privacy door 101 to be closed in situations where the flight deck door 104 will not be opened. In such embodiments, the set of hinges 124 might not include a hinge spring 125 to bias the privacy door 101 to the open position 102. Alternatively, the latch recess 111 may include a minor detent to lightly engage the decompression latch 112 such that the hinge spring 125 cannot rotate the privacy door 101, but such that a crew member can push the privacy door 101 to disengage the decompression latch 112 from the detent.

In these implementations, the flight deck cable 117 may be operable from the flight deck area 200 to move the gate 113 to the closed position 115 so as to retain the decompression latch 112 within the latch recess 111 and lock the privacy door 101 in the closed position 103, to secure the intermediate cabin area 301 from the main cabin area 302. This may then allow the pilot to open the flight deck door 104.

Figure 10B:
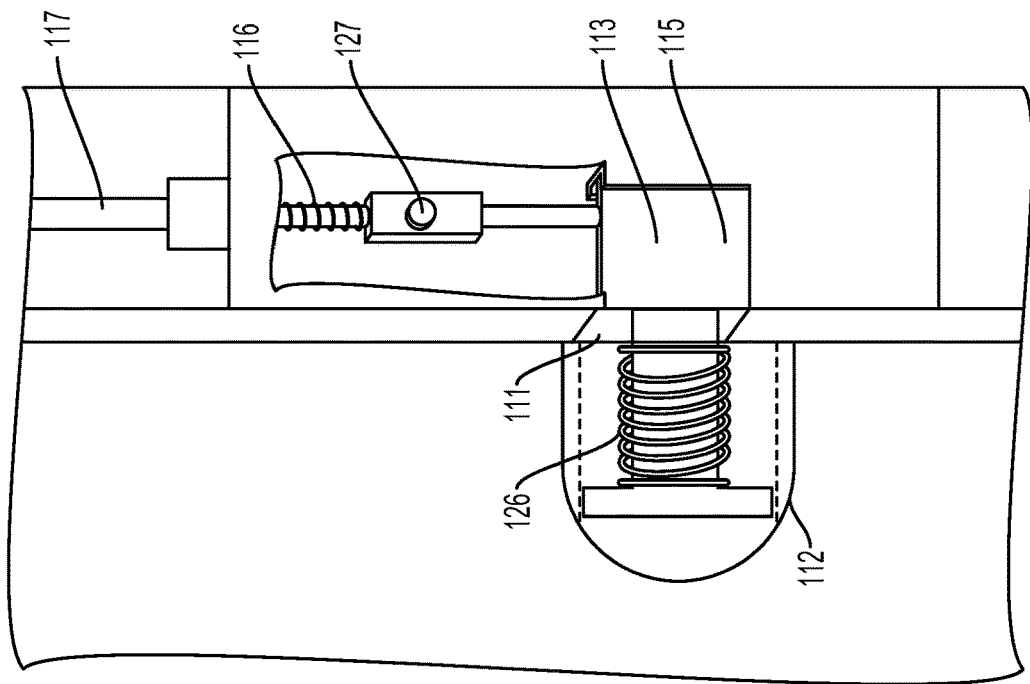
FIG. 10B illustrates internal components of the decompression latch and the second post, according to an example implementation
Figure 10A:
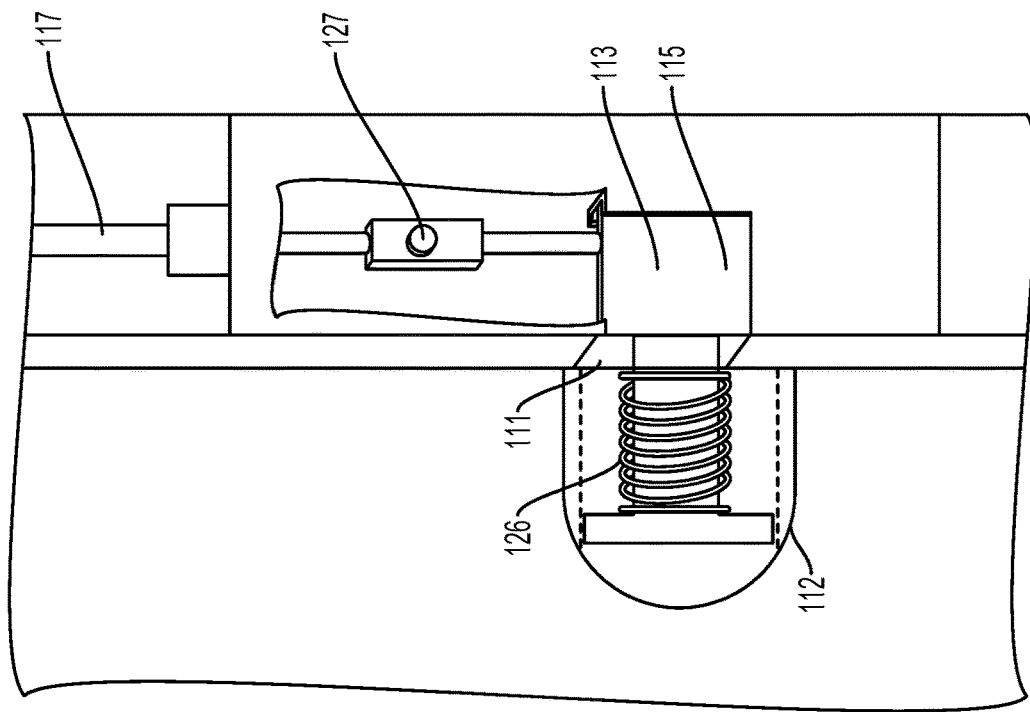
FIG. 10A illustrates internal components of the decompression latch and the second post, according to an example implementation.

In an example embodiment shown in FIG. 10A, some internal components of the decompression latch 112 and the second post 109 can be seen. For instance, the gate 113 may be movable by the flight deck cable 117 between the open position 114 and the closed position 115. With the gate 113 in the open position 114, the privacy door 101 may be closed such that the decompression latch 112 engages with the minor detent in the latch recess 111, in which position the privacy door 101 is closed but not locked by the gate 113. While the privacy door 101 is closed, the flight deck cable 117 is operable from the flight deck area 200 to move the gate 113 from the open position 114 to the closed position 115 so as to retain the decompression latch 112 in the latch recess 111 and lock the privacy door 101 in the closed position 103. With the gate 113 closed and the privacy door 101 closed, the privacy door 101 is locked to secure the intermediate cabin area 301 from the main cabin area 302. Similarly, while the privacy door 101 is open, the flight deck cable 117 is operable from the flight deck area 200 to move the gate 113 to the closed position 115, and a crew member in the main cabin area 302 may close the privacy door 101 whereupon the decompression latch 112 may retract and slide past the gate 113 into the latch recess 101 where the decompression latch 112 is retained, to lock the privacy door 101 and secure the intermediate cabin area 301 from the main cabin area 302. With the privacy door 101 locked, the flight crew may exit the flight deck area 200 into the intermediate cabin area 301. To then unlock the privacy door 101, the flight deck cable 117 is operable from the flight deck area 200 to move the gate 113 to the open position 114 that does not retain the decompression latch 112 within the latch recess 111, such that the privacy door 101 is unlocked and can be pulled open from the intermediate cabin area 301, or pushed open from the main cabin area 302, to disengage the decompression latch 112 from the minor detent in the latch recess 111.

FIG. 10B shows a view an alternate implementation of the decompression latch 112 and the gate 113 in the closed position 115, including some internal components of the decompression latch 112 and the second post 109. For example, the gate 113 may additionally include a gate spring 116 positioned to bias the gate 113 into the closed position 115 so as to retain the decompression latch 112 within the latch recess 111. In some implementations, when flight crew plans to exit the flight deck area 200 and the privacy door 101 is open, a crew member in the main cabin area 302 may close the privacy door 101, whereupon the decompression latch 112 retracts and slides past the gate 113 into the latch recess 111 where the decompression latch 112 is retained to lock the privacy door 101. With the gate 113 biased into the closed position 115 and the privacy door 101 closed, the privacy door 101 remains locked to secure the intermediate cabin area 301 from the main cabin area 302, such that the flight crew may exit the flight deck area 200 into the intermediate cabin area 301. When the flight crew returns to the flight deck area 200, the flight deck cable 117 is operable from the flight deck area 200 to move the gate 113 to the open position 114, compressing the gate spring 116, such that the gate 113 does not retain the decompression latch 112 within the latch recess 111. Thereafter, and as noted in examples above, the privacy door 101 may be moved to the open position 102 via the hinge spring 125 biasing the door open (absent any detent in the latch recess 111 to engage decompression latch 112). Similarly, moving the gate 113 to the open position 114 via operation of the knob 127, or via operation of the main cabin cable 118, as discussed in the examples above, may also involve compression the gate spring 116.

As noted above, the decompression latch 112 may be configured to disengage from the latch recess 111 in response to a decompression of the aircraft 400 detected forward of the privacy door 101. In some embodiments, as shown in FIGS. 10A and 10B, the privacy door 101 may include a decompression spring 126 positioned to bias the decompression latch 112 toward the first post 108 so as to disengage the decompression latch 112 from the latch recess 111. For instance, the decompression spring 126 may be retained by a pin or a similar structure that is released when the forward decompression is detected, which may then allow the decompression spring 126 to bias the decompression latch 112 out of the latch recess 111.

One useful feature of the privacy door assembly 150 is that it may be possible to retrofit the door frame 107 and privacy door 101 into an existing aircraft 400. However, it may be desirable in such situations to minimize the additional structural loads that may be imposed on the aircraft 400 by the privacy door assembly 150. For instance, if the door frame 107 is connected to both the floor and ceiling of the aircraft 400 with fixed connections, then some otherwise expected deflections in the floor structure of the aircraft 400, for example, may induce additional loads at the ceiling structure, transferred by the door frame 107, that otherwise would not be present.

Therefore, the door frame 107 may be installed such that one or more of the connections to the aircraft 400 maintains at least one degree of freedom of movement, to reduce the load transfer along the door frame 107. For example, and with reference to FIG. 11, the door frame 107 may include a connector 119 for coupling the door frame 107 to an adjacent structure 120 of the aircraft 400. The connector 119, when coupled to the adjacent structure 120 of the aircraft 400, may provide at least one degree of freedom of movement for the door frame 107 with respect to the adjacent structure 120.

Figure 11:
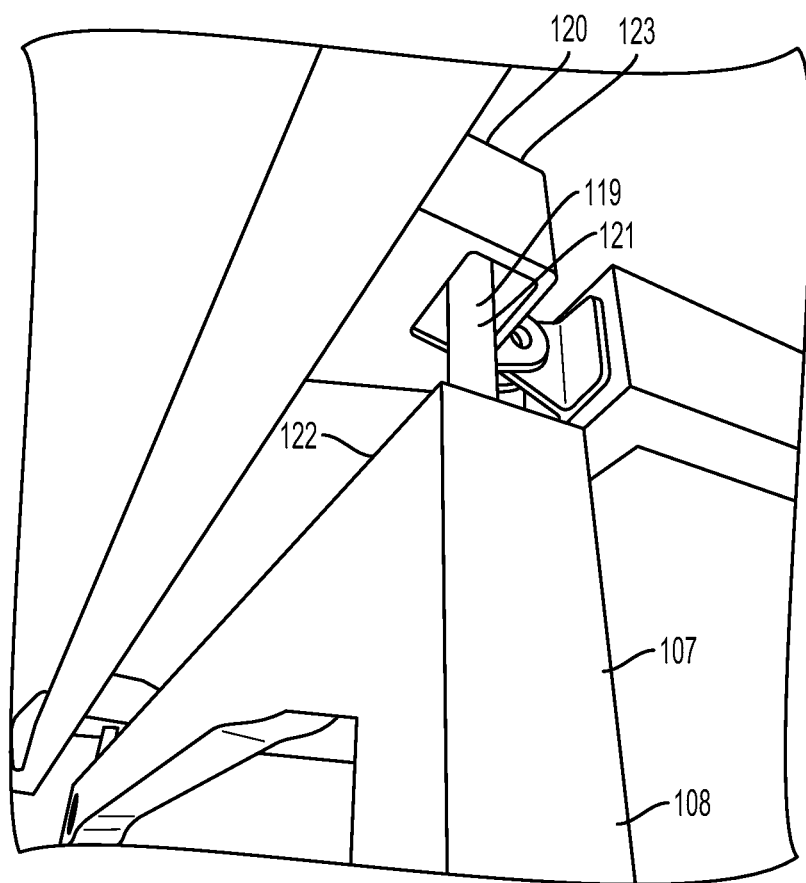
FIG. 11 illustrates a slip pin of a door frame coupled to a ceiling bracket of an aircraft, according to an example implementation.

For instance, as shown in the example of FIG. 11, the connector 119 may include a slip pin 121 positioned at an upper end 122 of the first post 108, and the adjacent structure 120 may comprises a ceiling bracket 123 of the aircraft 400. The slip pin 121, when coupled to the ceiling bracket 123, may include at least two degrees of freedom of movement for the door frame 107 with respect to the ceiling bracket 123. In the example shown in FIG. 11, the slip pin 121 is free to move both vertically and from left to right in the ceiling bracket 123. In this way, any slight deflections of the floor of the aircraft 400, where the door frame 107 may have be fixed, might not cause an additional structural load on the ceiling bracket 123, by way of the door frame 107.

Figure 12:
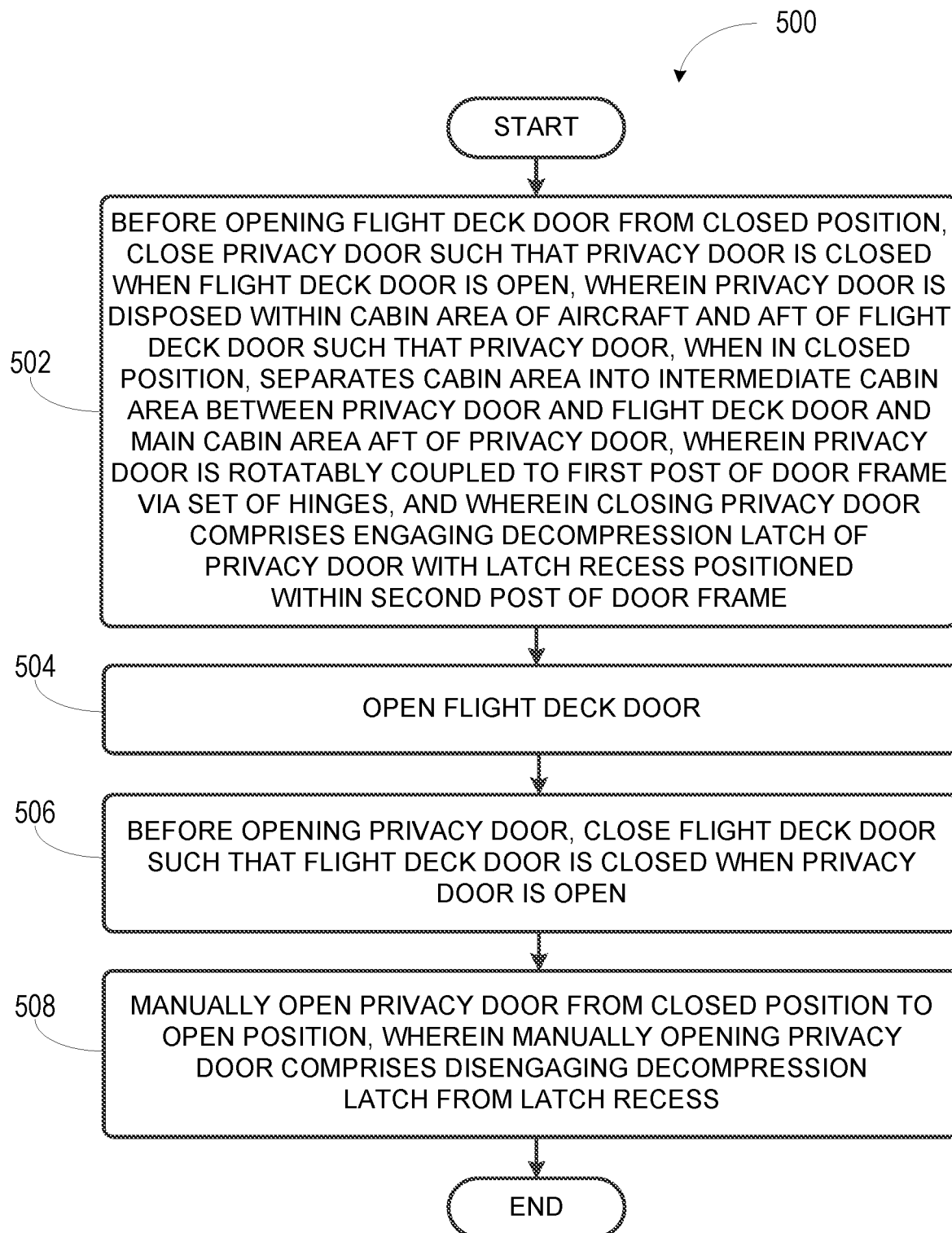
FIG. 12 shows a flowchart of an example method for operation of a privacy door on an aircraft, according to an example implementation.

Referring now to FIG. 12, a flowchart of a method 500 for operation of a privacy door on an aircraft is shown, according to an example implementation. Method 500 shown in FIG. 12 presents an example of a method that, for instance, could be used with the privacy door 101 on the aircraft 400, as shown in FIGS. 1-11 and discussed above. It should be understood that for this and other processes and methods disclosed herein, flowcharts show functionality and operation of one possible implementation of present examples.

Alternative implementations are included within the scope of the examples of the present disclosure, in which functions may be executed out of order from that shown or discussed, including substantially concurrently, depending on the functionality involved, as would be understood by those reasonably skilled in the art.

At block 502, the method 500 includes, before opening the flight deck door 104 from the closed position 106, closing the privacy door 101 such that the privacy door 101 is closed when the flight deck door 104 is open. As discussed above, the aircraft 400 includes a flight deck door 104 that, when in a closed position 106, separates a flight deck area 200 of the aircraft 400 from a cabin area 300 of the aircraft 400. The privacy door 101 is disposed within the cabin area 300 of the aircraft 400 and aft of the flight deck door 104 such that the privacy door 101, when in a closed position 103, separates the cabin area 300 into an intermediate cabin area 301 between the privacy door 101 and the flight deck door 104 and a main cabin area 302 aft of the privacy door 101. As noted previously, the privacy door 101 may be rotatably coupled to a first post 108 of a door frame 107 via a set of hinges 124. Further, closing the privacy door 101 may include engaging a decompression latch 112 of the privacy door 101 with a latch recess 111 positioned within a second post 109 of the door frame 107.

For example, during ground operations when a flight crew first enters the aircraft 400, the flight crew may enter the intermediate cabin area 301, and then close the privacy door 101 behind them before opening the flight deck door 104 to enter the flight deck 200. As another example, during flight operations, the pilot of the aircraft 400 may contact the cabin crew from the flight deck area 200 over an intercom or similar communications device, and let the cabin crew know the flight deck door 104 needs to be opened. The cabin crew may then close the privacy door 101, as discussed in the examples above.

Further, closing the privacy door 101 may include first operating the lever 132 to move the slam latch 130 away from the first post 108, from the first position 135 to the second position 136. This may disengage the slam latch 130 from the slot 131, before rotating the privacy door 101 to the closed position 103, as shown in FIG. 8.

At block 504, the method 500 includes opening the flight deck door 104. For example, the flight crew may open the flight deck door 104 for the reasons discussed above, including the rotation of flight crew between flights, or if the flight crew needs to exit the flight deck area 200 during flight operations.

At block 506, the method 500 includes, before opening the privacy door 101, closing the flight deck door 104 such that the flight deck door 104 is closed when the privacy door 101 is open. In this way, the flight crew and the cabin crew can maintain a privacy and security barrier between the main cabin area 302 and the flight deck area 200 by maintaining either the flight deck door 104 or the privacy door 101 in a closed position while the other door is open.

At block 508, the method 500 includes manually opening the privacy door 101 from the closed position 103 to the open position 102. As noted above, manually opening the privacy door 101 may include disengaging the decompression latch 112 from the latch recess 111. In some implementations, the set of hinges 124 may include a hinge spring 125, which may bias the privacy door 101 to the open position after the decompression latch 112 is disengaged from the latch recess 111.

As discussed above and as shown in FIGS. 6-8, the privacy door 101 may include a slam latch 130 positioned to engage a slot 131 in the first post 108 of the door frame 107 when the privacy door 101 is in the open position 102 and when the slam latch 130 is in a first position 135. Accordingly, manually opening the privacy door 101 from the closed position 103 to the open position 102 may include engaging the slam latch 130 within the slot 131.

Further, the slam latch 130 may include a slam latch spring 137, and engaging the slam latch 130 within the slot 131 may include biasing the slam latch 130 toward the first post 108 and into the slot 131 via the slam latch spring 137. In some implementations, the slam latch spring 137 may not be included in the privacy door 101, and engaging the slam latch 130 within the slot 131 may alternatively include operating the lever 132 to move the slam latch to the first position 135 to engage the slam latch 130 within the slot 131.

In some embodiments, the first post 108 may include a cylindrical striker 138, which may include the slot 131. In such embodiments, closing the privacy door 101 may include biasing the slam latch 130 toward the first post 108 via the slam latch spring 137 such that the slam latch 130 abuts the cylindrical striker 138, as discussed above.

To facilitate the manual opening of the privacy door 101, the second post 109 may include a gate 113 that is movable between an open position 114 and a closed position 115 configured to retain the decompression latch 112 within the latch recess 111, as discussed above and shown in FIGS. 8-9. Further, the gate 113 may be coupled to a knob 127 that is positioned on a forward side 110 of the second post 109. Accordingly, in some examples, manually opening the privacy door 101 at block 508 of the method 500 may include operating the knob 127 to move the gate 113 from the closed position 115 to the open position 114 so that the gate 113 does not retain the decompression latch 112 within the latch recess 111. The privacy door 101 may then be pulled open from within the intermediate cabin area 301 using the knob 127, for example. Alternatively, the hinge spring 125 may bias the privacy door 101 to the open position 102 once the decompression latch 112 is no longer retained within the latch recess 111.

Further, although it may not be part of the normal operation of the privacy door 101, it may be possible to manually open the privacy door 101 from the main cabin area 302 as well, according to the examples discussed above. In particular, the gate 113 may be coupled to a main cabin cable 118 extending from the second post 109 to the main cabin area 302 of the aircraft 400, as shown in FIGS. 8-9. Thus, in some embodiments, manually opening the privacy door 101 at block 508 of the method 500 may include operating the main cabin cable 118 from the main cabin area 302 to move the gate 113 from the closed position 115 to the open position 114 in which the gate 113 does not retain the decompression latch 112 in the latch recess 111. As discussed above, the operable portion of the main cabin cable 118 may be discreetly located within the main cabin area 302.

In some implementations, the privacy door 101 may also be manually openable from the flight deck area 200, as previously discussed. For instance, the gate 113 may be coupled to a flight deck cable 117 extending from the second post 109 to the flight deck area 200 of the aircraft 400, as shown in FIGS. 8-9. Accordingly, in some examples, manually opening the privacy door 101 at block 508 of the method 500 may include operating the flight deck cable 117 from the flight deck area 200 to move the gate 113 to the open position 114 such that the gate 113 does not retain the decompression latch 112 in the latch recess 111. As discussed above, the privacy door 101 may then be biased to the open position 102 by the hinge spring 125, or it may be pushed or pulled open by a member of the cabin crew. Further, the gate 113 may include a gate spring 116 to bias the gate 113 to the closed position 115, as shown in FIG. 10B. Accordingly, moving the gate 113 to the open position 114 in the examples above may involve compressing the gate spring 116.

Additionally, the flight deck cable 117 may also be operable to move the gate 113 to the closed position 115, as described in the examples above. Therefore, it is also possible that closing the privacy door 101 at block 502 of the method 500 may involve operating the flight deck cable 117 from the flight deck area 200 to move the gate 113 to the closed position 115 such that the gate 113 retains the decompression latch 112 in the latch recess 111, to thereby lock the privacy door 101 in the closed position 103 and secure the intermediate cabin area 301 from the main cabin area 302.

As noted above, the privacy door 101 may be configured to respond to a decompression event on the aircraft 400 during flight operations. For example, the method 500 for operation of the privacy door 101 may further include the steps of detecting a decompression of the aircraft 400 forward of the privacy door 101 when the privacy door 101 is in the closed position 103. Further, in response to the detected decompression of the aircraft 400 forward of the privacy door 101, the method 500 may include automatically disengaging the decompression latch 112 from the latch recess 111.

In some implementations, as shown in FIGS. 10A and 10B, the privacy door 101 may include a decompression spring 126. In such implementations, automatically disengaging the decompression latch 112 from the latch recess 111 may include biasing the decompression latch 112 toward first post 108 via the decompression spring 126 such that decompression latch 112 disengages the latch recess 111.

As mentioned in previous examples, the privacy door 101 may also be configured to respond to a decompression aft of the privacy door 101. For instance, as shown in FIGS. 4-5, the privacy door 101 may include a panel 143 having a panel decompression latch 146 configured to engage the privacy door 101 and maintain the panel 143 in a closed position 145 such that the panel 143 covers an aperture 142 in the privacy door 101.

In this arrangement, the method 500 for operation of the privacy door 101 may further include detecting a decompression of the aircraft 400 aft of the privacy door 101 when the privacy door 101 is in the closed position 103. In response to the detected decompression of the aircraft 400 aft of the privacy door 101, the method 500 may include disengaging the panel decompression latch 146 from the privacy door 101. For instance, the panel decompression latch 146 may disengage from the privacy door 101 in a similar manner to the decompression latch 112 discussed above.

Further, in some embodiments, the panel 143 may be rotatably coupled to the privacy door 101. In such embodiments, and in response to the detected decompression of the aircraft 400 aft of the privacy door 101, the method 500 may further include rotating the panel 143 into the main cabin area 302 to an open position 144 such that the aperture 142 conveys an airflow rate from the intermediate cabin area 301 to the main cabin area 302, as shown in FIG. 5 and discussed in the examples above.

Figure 13:
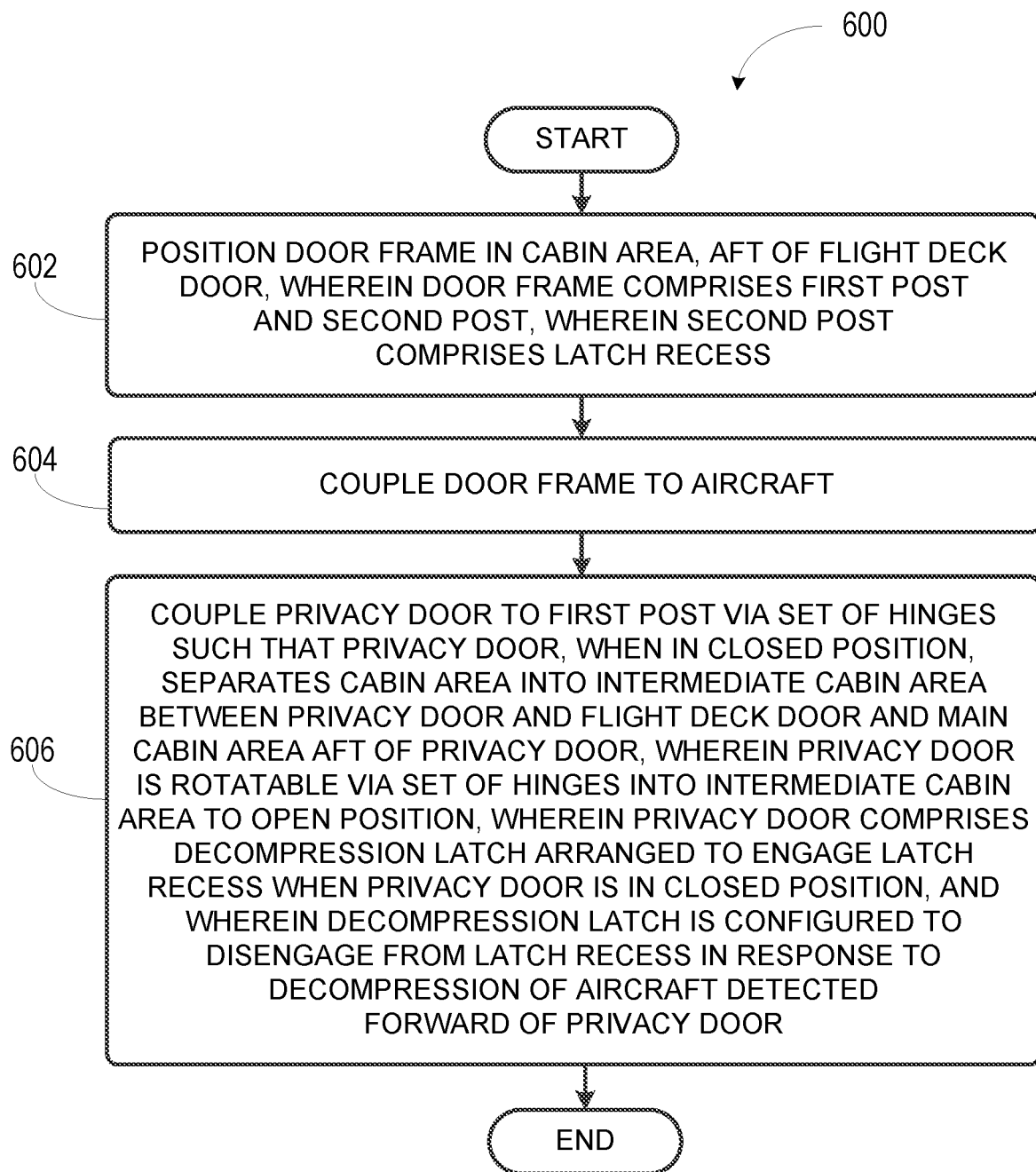
FIG. 13 shows a flowchart of an example method for establishing a privacy door relative to a flight deck door of an aircraft, according to an example implementation.

Referring now to FIG. 13, a flowchart of a method 600 for establishing a privacy door relative to a flight deck door of an aircraft is shown, according to an example implementation. Method 600 shown in FIG. 13 presents an example of a method that, for instance, could be performed by the privacy door system 100, as shown in FIGS. 1-11 and discussed above. It should be understood that for this and other processes and methods disclosed herein, flowcharts show functionality and operation of one possible implementation of present examples. In this regard, each block in the flowchart may represent a module, a segment, or a portion of program code, which includes one or more instructions executable by a processor for implementing or causing specific logical functions or steps in the process. For example, the method 600 may be implemented by one or more computing devices of a robotic assembly system. Alternative implementations are included within the scope of the examples of the present disclosure, in which functions may be executed out of order from that shown or discussed, including substantially concurrently, depending on the functionality involved, as would be understood by those reasonably skilled in the art.

At block 602, the method 600 includes positioning a door frame, such as the door frame 107 shown in FIGS. 1 and 3, in the cabin area 300 of the aircraft 400, aft of the flight deck door 104. The door frame 107 is a part of the privacy door system 100, as indicated in FIG. 1, which also includes the flight deck door 104 and the privacy door 101, along with some or all of the additional features described in the examples above.

As previously described, the flight deck door 104, when in a closed position 106, separates a flight deck area 200 of the aircraft 400 from a cabin area 300 of the aircraft 400. Further, the door frame 107 may include a first post 108 and a second post 109, and the second post 109 may include a latch recess 111, as shown in FIG. 3.

At block 604, the method 600 includes coupling the door frame 107 to the aircraft 400. To facilitate this, the door frame 107 may include a connector 119 for coupling the door frame 107 to an adjacent structure 120 of the aircraft 400. As discussed above it may be desirable to couple the door frame 107 to the aircraft 400 in such a way that the likelihood of the door frame 107 imposing additional structural loads on the aircraft 400 is reduced. Consequently, coupling the door frame 107 to the aircraft 400 may include coupling the connector 119 to the adjacent structure 120 such that the door frame 107 maintains at least one degree of freedom of movement with respect to the adjacent structure 120.

In some implementations, as shown in FIG. 11, the connector 119 may include a slip pin 121 positioned at an upper end 122 of the first post 108, and the adjacent structure 120 may include a ceiling bracket 123. Accordingly, coupling the connector 119 to the adjacent structure 120 may include coupling the slip pin 121 to the ceiling bracket 123 such that the door frame 107 maintains at least two degrees of freedom of movement with respect to the ceiling bracket 123, as discussed above.

At block 606, the method 600 includes coupling the privacy door 101 to the first post 108 via a set of hinges 124 such that the privacy door 101, when in a closed position 103, separates the cabin area 300 into an intermediate cabin area 301 between the privacy door 101 and the flight deck door 104 and a main cabin area 302 aft of the privacy door 101. The privacy door 101 is rotatable via the set of hinges 124 into the intermediate cabin area 301 to an open position 102. Further, the privacy door 101 may include a decompression latch 112 as discussed in the examples above, configured to disengage from the latch recess 111 in the first post 108 in response to a decompression of the aircraft 400 detected forward of the privacy door 101.

As noted previously, and as shown in FIG. 8-9, the second post 109 may include a gate 113 that is movable between an open position 114 and a closed position 115 configured to retain the decompression latch 112 within the latch recess 111. The second post 109 may further include a knob 127 for moving the gate 113 to the open position 114 and then opening the privacy door 101 from the intermediate cabin area 301. In some embodiments, it may also be desirable to be able to move the gate 113 to the open position from the main cabin area 302. Accordingly, the method 600 may further include extending a main cabin cable 118 from the gate 113 through the second post 109 and into the main cabin area 302 such that the main cabin cable 118 is operable from the main cabin area 302 to move the gate 113 from the closed position 115 to the open position 114, such that the gate 113 does not retain the decompression latch 112 in the latch recess 111. As discussed above, the main cabin cable 118 may be extended to a discreet location within the main cabin area 302.

Similarly, the method 600 may include extending a flight deck cable 117 from the gate 113 into the flight deck area 200 such that the flight deck cable 117 is operable from the flight deck area 200 to move the gate 113 to the open position 114 such that the gate 113 does not retain the decompression latch 112 in the latch recess 111.

In some embodiments, the flight deck cable 117 may be extended into the flight deck area 200 such that the flight deck cable 117 is operable from the flight deck area 200 to move the gate 113 to the closed position 115 so as to retain the decompression latch 112 in the latch recess 111 and lock the privacy door 101 in the closed position 103, securing the intermediate cabin area 301 from the main cabin area 302 aft of the privacy door 101. This functionality may be provided in addition to, or as an alternative to, the operation of the flight deck cable 117 to move the gate 113 to the open position 114.

As discussed in some of the implementations above, the privacy door 101 may include a slam latch 130, as shown in FIGS. 6-8. The slam latch 130 may be positioned to engage a slot 131 in the first post 108 of the door frame 107 when the privacy door 101 is in the open position 102 and the slam latch 130 is in a first position 135. Accordingly, after coupling the privacy door 101 to the first post 108 via the set of hinges 124, the method 600 may include rotating the privacy door 101 to the open position 102 and engaging the slam latch 130 within the slot 131.

In some embodiments, as previously mentioned, the method the slam latch 130 may be coupled to a lever 132 positioned on a forward side 133 of the privacy door 101. In such embodiments, the method 600 may further include operating the lever 132 to move the slam latch 130 away from the first post 108 to a second position 136. As discussed above and shown in FIGS. 6-7, moving the slam latch 130 to the second position 136 disengages the slam latch 130 from the slot 131.

As mentioned above, the method 600 may be performed by the privacy door system 100. In addition to the features discussed with respect to the performance of method 600, the privacy door system 100 may include additional features as discussed in the other examples above. For instance, the privacy door 101 may be rotatably coupled to the door frame 107 via a set of hinges 124. In some embodiments, the set of hinges 124 includes a hinge spring 125 positioned to bias the privacy door 101 from the closed position 103 to the open position 102 when the decompression latch 112 and the latch recess 111 are disengaged.

Further, the slam latch 130 discussed above with respect to method 600 may further include a slam latch spring 137 positioned to bias the slam latch 130 toward the first post 108. Further, the first post 108 may include a cylindrical striker 138, which may include the slot 131.

As discussed in previous examples, the privacy door system 100 may include features that may allow air to flow from an area of high pressure to an area of low pressure, in the event of a decompression of the aircraft 400. For instance, the privacy door 101 may include a decompression spring 126, as shown in FIGS. 10A and 10B, that is positioned to bias the decompression latch 112 toward the first post 108 so as to disengage the decompression latch 112 from the latch recess 111 in response to the decompression of the aircraft 400 detected forward of the privacy door 101.

The privacy door system 100 may also provide for airflow in the event of an aft decompression. For example, the privacy door 101 may include a vent 140, as shown in FIG. 3. The vent 140 may include a plurality of openings 141 forming a fluid connection between the intermediate cabin area 301 and the main cabin area 302 when the privacy door 101 is in the closed position 103. The plurality of openings 141 may include an open area sufficient to convey an airflow rate from the intermediate cabin area 301 to the main cabin area 302 in response to a decompression of the aircraft 400 detected aft of the privacy door 101, as discussed above.

Alternatively, the privacy door 101 may include an aperture 142 having an open area sufficient to convey an airflow rate from the intermediate cabin area 301 to the main cabin area 302 in response to a decompression of the main cabin area 302 when the privacy door 101 is in the closed position 103. As shown in FIGS. 4-5 and discussed in above, a panel 143 may be rotatably coupled to the privacy door 101, and the panel 143 may include a panel decompression latch 146 configured to engage the privacy door 101 and maintain the panel 143 in a closed position 145 such that the panel 143 covers the aperture 142.

The panel decompression latch 146 may be configured to disengage from the privacy door 101 in response to a decompression of the aircraft 400 detected aft of the privacy door 101, as noted previously. Further, the panel 143 may be rotatable into the main cabin area 302 from the closed position 145 to an open position 144.

As discussed above, the privacy door system 100 may be established in an existing aircraft 400, through a retrofit installation of the privacy door assembly 150 shown in FIG. 3. In this way, the privacy door assembly 150 may be viewed as an installation kit, which may have standard dimensions that are compatible with multiple models of aircraft 400 within a given fleet.

The privacy door assembly 150 may include a door frame 107, such as the door frame 107 shown in FIG. 3, which includes a first post 108 and a second post 109, where the second post 109 comprises a latch recess 111. The privacy door assembly 150 also includes a privacy door 101 rotatably coupleable to the first post 108 via a set of hinges 124. The privacy door 101 further includes a decompression latch 112 arranged to engage the latch recess 111 when the privacy door 101 is in a closed position 103 within the door frame 107. Additionally, the decompression latch 112 may be configured to disengage from the latch recess 111 in response to a decompression detected on a forward side 133 of the privacy door 101, similar to the examples discussed above.

As above, the set of hinges 124 in the privacy door assembly 150 may include a hinge spring 125 positioned to bias the privacy door 101 from the closed position 103 to an open position 102 when the decompression latch 112 and the latch recess 111 are disengaged.

Further, the privacy door assembly 150 may include a slam latch 130 as discussed above and as generally shown in FIGS. 6-8. The slam latch 130 may be positioned in the privacy door 101 to engage a slot 131 in the first post 108 of the door frame 107 when the privacy door 101 is in the open position 102 and when the slam latch 130 is in a first position 135. The slam latch 130 may be coupled to a lever 132 positioned on a forward side 133 of the privacy door 101. As in previous examples, the lever 132 is operable to move the slam latch 130 away from the first post 108 to a second position 136 so as to disengage the slam latch 130 from the slot 131.

The privacy door 101 of the privacy door assembly 150 may further include a slam latch spring 137 positioned to bias the slam latch 130 toward the first post 108. As in the examples above, the first post 108 may include a cylindrical striker 138, and the cylindrical striker 138 may include the slot 131.

The privacy door assembly 150 may also include, as a part of the second post 109, a gate 113 movable between an open position 114, and a closed position 115 configured to retain the decompression latch 112 within the latch recess 111, as shown in FIGS. 8-9 and discussed above. The gate 113 may be coupled to a knob 127 positioned on a forward side 110 of the second post 109, and the knob 127 may be operable to move the gate 113 to the open position 114 such that the gate 113 does not retain the decompression latch 112 within the latch recess 111.

Further, the privacy door assembly 150 may include a flight deck cable 117 coupleable to the gate 113 and extendable from the second post 109 forward of the privacy door 101. The flight deck cable 117 may be operable to move the gate 113 from the open position 114 to the closed position 115 so as to retain the decompression latch 112 within the latch recess 111 and lock the privacy door 101 in the closed position 103. Additionally or alternatively, the flight deck cable 117 may be operable to move the gate 113 from the closed position 115 to the open position 114 such that the gate 113 does not retain the decompression latch 112 in the latch recess 111.

In some implementations, the privacy door assembly 150 may include a main cabin cable 118 coupleable to the gate 113 and extendable from the second post 109 aft of the privacy door 101. The main cabin cable 118 may be operable to move the gate 113 from the closed position 115 to the open position 114 such that the gate 113 does not retain the decompression latch 112 within the latch recess 111. Further, the gate 113 may include a gate spring 116 to bias the gate 113 to the closed position 115. Accordingly, moving the gate 113 to the open position 114 in the examples discussed above may include compression the gate spring 116.

The privacy door assembly 150 may also include the decompression considerations noted above. For instance, the privacy door 101 of the privacy door assembly 150 may include a decompression spring 126 as shown in FIGS. 10A and 10B. The decompression spring 126 may be positioned to bias the decompression latch 112 toward the first post 108 so as to disengage the decompression latch 112 from the latch recess 111 in response to the decompression detected on the forward side 133 of the privacy door 101.

The privacy door 101 of the privacy door assembly 150 may also include the vent 140, including the plurality of openings 141, as shown in FIG. 3 and discussed above. In some other embodiments, the privacy door 101 may include an aperture 142, and a panel 143 rotatably coupled to the privacy door 101, as shown in FIGS. 4-5. The panel 143 may include a panel decompression latch 146 configured to engage the privacy door 101 and maintain the panel 143 in a closed position 145 such that the panel 143 covers the aperture 142. Further the panel 143 may be rotatable from the closed position 145 to an open position 144 on an aft side 134 of the privacy door 101. Additionally, the panel decompression latch 146 may be configured to disengage from the privacy door 101 in response to a decompression detected on the aft side 134 of the privacy door 101.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated

What is claimed is:

1. A method for establishing a privacy door relative to a flight deck door of an aircraft, wherein the flight deck door, when in a closed position, separates a flight deck area of the aircraft from a cabin area of the aircraft, the method comprising:

positioning a door frame in the cabin area, aft of the flight deck door, wherein the door frame comprises a first post and a second post, and wherein the second post comprises a latch recess;

coupling the door frame to the aircraft; and coupling the privacy door to the first post via a set of hinges such that the privacy door, when in a closed position, separates the cabin area into an intermediate cabin area between the privacy door and the flight deck door and a main cabin area aft of the privacy door, wherein the privacy door is rotatable via the set of hinges into the intermediate cabin area to an open position, wherein the privacy door comprises a decompression latch arranged to engage the latch recess when the privacy door is in the closed position, and wherein the decompression latch is configured to disengage from the latch recess in response to a decompression of the aircraft detected forward of the privacy door.

2. The method of claim 1, wherein the second post includes a gate movable between an open position and a closed position configured to retain the decompression latch within the latch recess, the method further comprising:

extending a flight deck cable from the gate into the flight deck area such that the flight deck cable is operable from the flight deck area to move the gate to the closed position so as to retain the decompression latch in the latch recess and lock the privacy door in the closed position, securing the intermediate cabin area from the main cabin area aft of the privacy door.

3. The method of claim 1, wherein the second post includes a gate movable between an open position and a closed position configured to retain the decompression latch within the latch recess, the method further comprising:

extending a flight deck cable from the gate into the flight deck area such that the flight deck cable is operable from the flight deck area to move the gate to the open position such that the gate does not retain the decompression latch in the latch recess.

4. The method of claim 3, further comprising:
extending a main cabin cable from the gate through the second post and into the main cabin area such that the main cabin cable is operable from the main cabin area to move the gate from the closed position to the open position such that the gate does not retain the decompression latch in the latch recess, to enable the privacy door to be opened from the main cabin area.

5. The method of claim 1, wherein the door frame comprises a connector for coupling the door frame to an adjacent structure of the aircraft, and wherein coupling the door frame to the aircraft comprises coupling the connector to the adjacent structure such that the door frame maintains at least one degree of freedom of movement with respect to the adjacent structure.

6. The method of claim 5, wherein the connector comprises a slip pin positioned at an upper end of the first post and wherein the adjacent structure comprises a ceiling bracket, and wherein coupling the connector to the adjacent structure comprises coupling the slip pin to the ceiling bracket such that the door frame maintains at least two degrees of freedom of movement with respect to the ceiling bracket.

7. The method of claim 1, wherein the privacy door comprises a slam latch positioned to engage a slot in the first post of the door frame when the privacy door is in the open position and the slam latch is in a first position, the method further comprising:
after coupling the privacy door to the first post via the set of hinges, rotating the privacy door to the open position; and
engaging the slam latch within the slot.

8. The method of claim 7, wherein the slam latch is coupled to a lever positioned on a forward side of the privacy door, the method further comprising:
operating the lever to move the slam latch away from the first post to a second position, wherein moving the slam latch to the second position disengages the slam latch from the slot.

9. A privacy door system for an aircraft, the privacy door system comprising:
a privacy door assembly including a door frame and privacy door, disposed within the aircraft in a cabin area aft of a flight deck door, wherein the flight deck door, when in a closed position, separates a flight deck area of the aircraft from the cabin area of the aircraft;
the door frame and privacy door being disposed within the cabin area of the aircraft and aft of the flight deck door such that the privacy door, when in a closed position, separates the cabin area into an intermediate cabin area between the privacy door and the flight deck door and a main cabin area aft of the privacy door, wherein the privacy door further comprises a decompression latch;
the door frame comprising a first post and a second post disposed against vertical structures in the cabin area of the aircraft, wherein the privacy door is rotatably coupled to the first post via a set of hinges such that the privacy door is rotatable into the intermediate cabin area to an open position; and
a latch recess positioned within the second post, wherein the latch recess is arranged to engage the decompression latch of the privacy door when the privacy door is in the closed position, and wherein the decompression latch is configured to disengage from the latch recess in response to a decompression of the aircraft detected forward of the privacy door.

10. The privacy door system of claim 9, wherein the set of hinges includes a hinge spring positioned to bias the privacy door from the closed position to the open position when the decompression latch and the latch recess are disengaged.

11. The privacy door system of claim 9, wherein the privacy door comprises a slam latch positioned to engage a slot in the first post of the door frame when the privacy door is in the open position and when the slam latch is in a first position, wherein the slam latch is coupled to a lever positioned on a forward side of the privacy door, and wherein the lever is operable to move the slam latch away from the first post to a second position so as to disengage the slam latch from the slot.

12. The privacy door system of claim 11, wherein the privacy door further comprises a slam latch spring positioned to bias the slam latch toward the first post, wherein the first post comprises a cylindrical striker, and wherein the cylindrical striker comprises the slot.

13. The privacy door system of claim 9, wherein the privacy door further comprises a decompression spring positioned to bias the decompression latch toward the first post so as to disengage the decompression latch from the latch recess in response to the decompression of the aircraft detected forward of the privacy door.

14. The privacy door system of claim 9, wherein the second post includes a gate movable between an open position and a closed position configured to retain the decompression latch within the latch recess when the gate is in the closed position and lock the privacy door in the closed position to secure the intermediate cabin area from the main cabin area, wherein the gate is coupled to a knob positioned on a forward side of the second post accessible from the intermediate cabin area, and wherein the knob is operable to move the gate to the open position such that the gate does not retain the decompression latch in the latch recess.

15. The privacy door system of claim 14, wherein the gate is coupled to a flight deck cable extending from the second post to the flight deck area of the aircraft, and wherein the flight deck cable is operable from the flight deck area to move the gate from the open position to the closed position so as to retain the decompression latch in the latch recess and lock the privacy door in the closed position, to secure the intermediate cabin area from the main cabin area.

16. The privacy door system of claim 14, wherein the gate is coupled to a flight deck cable extending from the second post to the flight deck area of the aircraft, and wherein the flight deck cable is operable from the flight deck area to move the gate from the closed position to the open position such that the gate does not retain the decompression latch in the latch recess.

17. The privacy door system of claim 14, wherein the gate is coupled to a main cabin cable extending from the second post to the main cabin area of the aircraft, and wherein the main cabin cable is operable from the main cabin area to move the gate from the closed position to the open position such that the gate does not retain the decompression latch in the latch recess.

18. The privacy door system of claim 9, wherein the privacy door further comprises a vent having a plurality of openings forming a fluid connection between the intermediate cabin area and the main cabin area when the privacy door is in the closed position, and wherein the plurality of openings comprise an open area sufficient to convey an airflow rate from the intermediate cabin area to the main cabin area in response to a decompression of the aircraft detected aft of the privacy door.

19. The privacy door system of claim 9, wherein the privacy door further comprises:
an aperture having an open area sufficient to convey an airflow rate from the intermediate cabin area to the main cabin area in response to a decompression of the main cabin area when the privacy door is in the closed position; and
a panel rotatably coupled to the privacy door, wherein the panel comprises a panel decompression latch configured to engage the privacy door and maintain the panel in a closed position such that the panel covers the aperture, wherein the panel is rotatable into the main cabin area from the closed position to an open position, and wherein the panel decompression latch is further configured to disengage from the privacy door in response to a decompression of the aircraft detected aft of the privacy door.

20. The privacy door system of claim 9, wherein the door frame comprises a connector for coupling the door frame to an adjacent structure of the aircraft, wherein the connector, when coupled to the adjacent structure of the aircraft, provides at least one degree of freedom of movement for the door frame with respect to the adjacent structure.

21. A privacy door assembly for installation in an aircraft relative to a flight deck door of the aircraft, the privacy door assembly comprising:
a door frame comprising a first post and a second post, wherein the second post comprises a latch recess; and
a privacy door rotatably coupleable to the first post via a set of hinges, wherein the privacy door comprises a decompression latch arranged to engage the latch recess when the privacy door is in a closed position within the door frame, and wherein the decompression latch is configured to disengage from the latch recess in response to a decompression detected on a forward side of the privacy door.

22. The privacy door assembly of claim 21, wherein the set of hinges includes a hinge spring positioned to bias the privacy door from the closed position to an open position when the decompression latch and the latch recess are disengaged.

23. The privacy door assembly of claim 21, wherein the privacy door comprises a slam latch positioned to engage a slot in the first post of the door frame when the privacy door is in the open position and when the slam latch is in a first position, wherein the slam latch is coupled to a lever positioned on a forward side of the privacy door, and wherein the lever is operable to move the slam latch away from the first post to a second position so as to disengage the slam latch from the slot.

24. The privacy door assembly of claim 23, wherein the privacy door further comprises a slam latch spring positioned to bias the slam latch toward the first post, wherein the first post comprises a cylindrical striker, and wherein the cylindrical striker comprises the slot.

25. The privacy door assembly of claim 21, wherein the privacy door further comprises a decompression spring positioned to bias the decompression latch toward the first post so as to disengage the decompression latch from the latch recess in response to the decompression detected on the forward side of the privacy door.

26. The privacy door assembly of claim 21, wherein the second post includes a gate movable between an open position and a closed position configured to retain the decompression latch within the latch recess, wherein the gate is coupled to a knob positioned on a forward side of the second post, and wherein the knob is operable to move the gate to the open position such that the gate does not retain the decompression latch within the latch recess.

27. The privacy door assembly of claim 26, further comprising a flight deck cable coupleable to the gate and extendable from the second post forward of the privacy door, wherein the flight deck cable is operable to move the gate from the open position to the closed position so as to retain the decompression latch within the latch recess and lock the privacy door in the closed position.

28. The privacy door assembly of claim 26, further comprising a flight deck cable coupleable to the gate and extendable from the second post forward of the privacy door, wherein the flight deck cable is operable to move the gate from the closed position to the open position such that the gate does not retain the decompression latch in the latch recess.

29. The privacy door assembly of claim 26, further comprising a main cabin cable coupleable to the gate and extendable from the second post aft of the privacy door, wherein the main cabin cable is operable to move the gate from the closed position to the open position such that the gate does not retain the decompression latch within the latch recess.

30. The privacy door assembly of claim 21, wherein the privacy door further comprises:
an aperture; and
a panel rotatably coupled to the privacy door, wherein the panel comprises a panel decompression latch configured to engage the privacy door and maintain the panel in a closed position such that the panel covers the aperture, wherein the panel is rotatable from the closed position to an open position on an aft side of the privacy door, and wherein the panel decompression latch is further configured to disengage from the privacy door in response to a decompression detected on the aft side of the privacy door.

* * * * *